US00RE46159E

(19) United States
(12) Reissued Patent
Kim et al.

(10) Patent Number: US RE46,159 E
(45) Date of Reissued Patent: Sep. 20, 2016

(54) METHOD OF DISPLAYING MESSAGES IN DIGITAL HOME APPLIANCES AND DISPLAY CONTROL DEVICE

(71) Applicant: SAMSUNG ELECTRONICS CO., LTD., Suwon-si (KR)

(72) Inventors: Hue-yin Kim, Seoul (KR); Woo-hyoung Lee, Yongin-si (KR)

(73) Assignee: SAMSUNG ELECTRONICS CO., LTD., Suwon-si (KR)

(21) Appl. No.: 14/583,016

(22) Filed: Dec. 24, 2014

Related U.S. Patent Documents

Reissue of:
(64) Patent No.: 8,339,241
Issued: Dec. 25, 2012
Appl. No.: 11/580,935
Filed: Oct. 16, 2006

(30) Foreign Application Priority Data

Dec. 29, 2005 (KR) ..... 10-2005-0133159

(51) Int. Cl.
*G06F 3/00* (2006.01)
*H04N 5/445* (2011.01)
*G06F 13/00* (2006.01)
*H04N 21/488* (2011.01)

(52) U.S. Cl.
CPC ..... *H04N 5/44513* (2013.01); *H04N 21/4882* (2013.01)

(58) Field of Classification Search
CPC ..... H04N 5/44513; H04N 21/485; H04N 21/814; H04N 21/654; H04N 21/4882; H04N 2005/44521
See application file for complete search history.

(56) References Cited

U.S. PATENT DOCUMENTS

| | | | | |
|---|---|---|---|---|
| 5,701,161 | A * | 12/1997 | Williams et al. | 348/468 |
| 6,466,939 | B1 * | 10/2002 | Lai et al. | |
| 7,197,715 | B1 * | 3/2007 | Valeria | 715/747 |
| 7,774,815 | B1 * | 8/2010 | Allen | 725/80 |
| 2002/0144267 | A1 * | 10/2002 | Gutta et al. | 725/46 |
| 2003/0117530 | A1 | 6/2003 | McGee et al. | |
| 2004/0010808 | A1 * | 1/2004 | deCarmo | 725/139 |
| 2004/0105031 | A1 * | 6/2004 | Shibusawa | 348/570 |
| 2004/0194146 | A1 * | 9/2004 | Bates | H04N 7/147 725/110 |
| 2004/0223599 | A1 * | 11/2004 | Bear | H04M 3/436 379/207.02 |
| 2004/0243941 | A1 * | 12/2004 | Fish | 715/752 |
| 2004/0244941 | A1 * | 12/2004 | Pleschiutschnigg et al. | 164/453 |
| 2006/0282850 | A1 * | 12/2006 | Kim | 725/38 |

(Continued)

FOREIGN PATENT DOCUMENTS

| | | | |
|---|---|---|---|
| JP | 2005-167343 | A | 6/2005 |
| JP | 2005167343 | A | 6/2005 |

(Continued)

OTHER PUBLICATIONS

Dolan, Report on Television Data Applications, Jul. 2001, U.S. Department of Commerce, National Institute of Standards and Technology, NIST GCR 01-818.*

*Primary Examiner* — Christina Y Leung
(74) *Attorney, Agent, or Firm* — Sughrue Mion, PLLC

(57) ABSTRACT

Provided are a method of displaying messages in a digital home appliance and a display control method therefore. The method includes storing user setting information regarding output of messages and displaying a message based on the stored user setting information, where the user setting information is received from a user.

20 Claims, 4 Drawing Sheets

(56) References Cited

U.S. PATENT DOCUMENTS

| | | | | |
|---|---|---|---|---|
| 2008/0209492 | A1* | 8/2008 | Matsuura et al. | 725/117 |
| 2009/0235306 | A1* | 9/2009 | Pugel | 725/33 |
| 2010/0211975 | A1* | 8/2010 | Boyer et al. | 725/40 |

FOREIGN PATENT DOCUMENTS

| | | | |
|---|---|---|---|
| KR | 1999-0080996 | A | 11/1999 |
| KR | 1019990080996 | A | 11/1999 |
| KR | 10-2000-0003540 | A | 1/2000 |
| KR | 20000003540 | A | 1/2000 |
| KR | 20000037294 | A | 7/2000 |
| KR | 1020000037294 | A | 7/2000 |
| KR | 10-2001-0055895 | A | 7/2001 |
| KR | 20010055895 | A | 7/2001 |
| KR | 10-2002-0014287 | A | 2/2002 |
| KR | 20020014287 | A | 2/2002 |
| KR | 20030073330 | A | 9/2003 |
| KR | 1020030073330 | A | 9/2003 |
| KR | 20040070269 | A | 8/2004 |
| KR | 1020040070269 | A | 8/2004 |
| KR | 10-2005-0059354 | A | 6/2005 |
| KR | 20050059354 | A | 6/2005 |

* cited by examiner

METHOD OF DISPLAYING MESSAGES IN DIGITAL HOME APPLIANCES AND DISPLAY CONTROL DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATIONS

This application claims the priority of Korean Patent Application No. 10-2005-133159, filed on Dec. 29, 2005, in the Korean Intellectual Property Office, the disclosure of which is incorporated herein in its entirety by reference.

BACKGROUND OF THE INVENTION

1. Field of the Invention

The present invention relates to a method of displaying messages in a digital home appliance in use in order to increase convenience to a user, and a display control device therefor.

2. Description of the Related Art

The development of digital home appliances with various communication functions allows information to be exchanged between them. However, when messages are displayed in digital home appliances without a rule, it may cause inconvenience to the user in using the digital home appliances.

Most messages (an advertisement, a securities service, a news service, etc.) which are included in a program, are not designed to be displayed when a user desires to view them, but are designed to be displayed when and in a manner that an information provider desires. Accordingly, messages are displayed irrespective of a user's desire, which may cause the user's inconvenience in using digital home appliances.

Although many popup messages are displayed in a computer system, a user would not feel any inconvenience therefor. However, when popup messages are displayed in a digital home appliance, such as a television (TV) or a DVD player, the user would feel annoyed because of the popup messages and feel that the use of the digital home appliance is disturbed by the popup messages. For example, while watching a movie, a securities message may pop up and cover a scene of the movie. While watching news on the TV in which software updating can be automatically performed and a message, "Do you want to update?" is displayed on the TV screen, the user has to remove the message by using a remote controller, thus causing the user's inconvenience.

SUMMARY OF THE INVENTION

The present invention provides a method and apparatus for controlling the displaying of messages in a digital home appliance in use so that a user will not be disturbed by the messages when the user does not want to view them.

According to an aspect of the present invention, there is provided a method of displaying a message in a digital home appliance, the method comprising storing user setting information regarding output of messages, where the user setting information is received from a user; and displaying the message based on the user setting information.

The displaying of the message may include determining whether the status of video output from the digital home appliance satisfies the user setting information; displaying the message when it is determined that the status of the output video satisfies the user setting information; and making the message enter a standby mode when it is determined that the status of the output video does not satisfy the user setting information.

The displaying of the message may further comprise monitoring the status of the output video and displaying the message entering the standby mode when the status of the video satisfies the user setting information.

The displaying of the message may further comprise displaying the message entering the standby mode in response to the user's request even if the status of the video does not satisfy the user setting information.

The determining of whether the status of the video satisfies the user setting information may comprise determining the status of the video, based on an electronic program guide received by the digital home appliance.

The determining of whether the status of the video satisfies the user setting information may comprise determining the status of the video by the patterns of the video and audio output from the digital home appliance.

If the message is urgent, the method further comprising displaying the message not based on the user setting information.

The message may comprise at least one of a message indicating degradation of the operation of the digital home appliance, and a disaster broadcast message.

The user setting information may comprise at least one of information regarding a time when the message is to be displayed; information regarding a location on a screen where the message is to be displayed; and information regarding the status of the message that is to be displayed.

According to another aspect of the present invention, there is provided an apparatus for controlling displaying of a message in a digital home appliance, the apparatus comprising a user setting information storage unit storing user setting information regarding output of the message, where the user setting information is received from a user; and a message management unit controlling displaying of the message based on the stored user setting information.

According to another aspect of the present invention, there is provided a digital home appliance comprising an audio/video decoder decoding audio data or video data received via a communication network; a message management unit storing user setting information regarding output of messages and controlling displaying a message based on the stored user setting information, where the user setting information is received from a user; and a controller controlling the operations of the audio/video decoder and the message management unit.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings.

Figure 1:
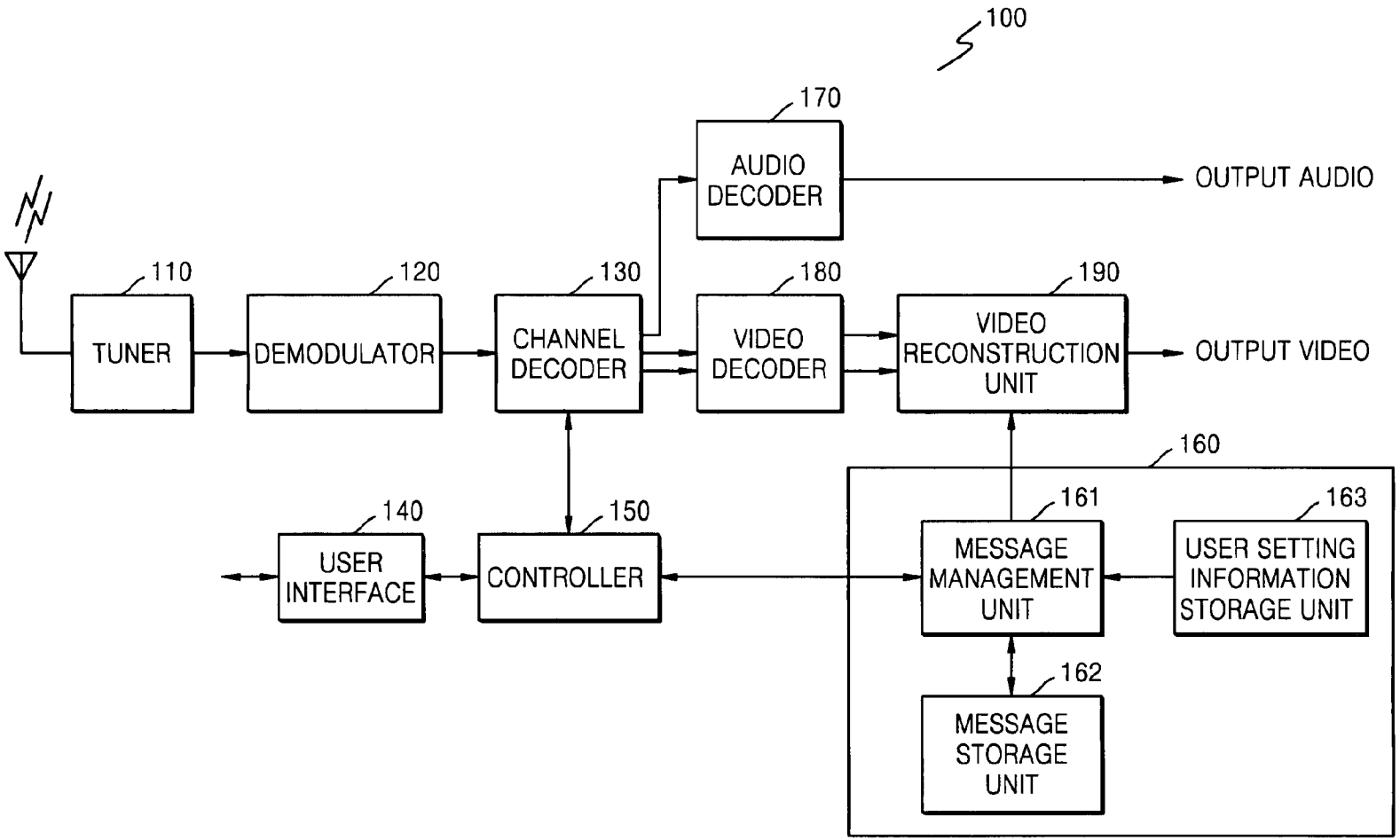
FIG. 1 is a schematic block diagram of a digital home appliance having a display control function according to an exemplary embodiment of the present invention.

FIG. 1 is a schematic block diagram of a digital home appliance 100 having a display control function according to an, exemplary embodiment of the present invention. Referring to FIG. 1, the digital home appliance 100 includes a tuner 110, a demodulator 120, a channel decoder 130, a user interface 140, a controller 150, a message display controller 160, an audio decoder 170, a video decoder 180, and a video reconstruction unit 190.

The tuner 110, for example, receives an orthogonal frequency division multiplexing (OFDM) modulated signal. The demodulator 120 generates a transmission frame by demodulating the signal from the tuner 110 and transmits it to the channel decoder 130.

The channel decoder 130 channel-decodes the received transmission frame to generate various types of service data. The audio decoder 170 receives and decodes audio data from the channel decoder 130, and the video decoder 180 demultiplexes service data into a plurality of data service data and outputs them to a screen (not shown).

The video reconstruction unit 190 receives content regarding a plurality of channels from the video decoder 180, reconstructs it in a predetermined format, and outputs the reconstructed result. Also, according to an exemplary embodiment of the present invention, the video reconstruction unit 190 receives a message from a message management unit 161 and combines the message with video that is to be output.

The controller 150 controls the above constituent elements of the digital home appliance 100. According to an exemplary embodiment of the present invention, referring to FIG. 1, the function of controlling the displaying of messages is included in the message display controller 160 but it may be included in the controller 150 without manufacturing the message display controller 160.

The user interface 140 allows a user not only to select a desired channel but also to set the time when messages are to be displayed. User setting information regarding the output of messages, which is received via the user interface 140, is stored in a user setting information storage unit 163 via the controller 150.

According to an exemplary embodiment of the present invention, the message display controller 160 controls messages to be displayed according to the user setting information received from the user. Thus, the message display controller 160 includes the message management unit 161, a message storage unit 162, and the user setting information storage unit 163.

The user setting information storage unit 163 stores the user setting information regarding the output of messages, which is input by a user via the user interface 140. For example, the user setting information includes information 10 regarding time when messages are to be displayed, information 20 regarding the location on a screen where the messages are to be displayed, and information 30 regarding the statuses of the messages that are to be displayed, which will later be described in greater detail with reference to FIG. 2.

The message storage unit 162 stores some of messages received via a communication network, which enter a standby mode without being directly output to a display (not shown), under control of the message management unit 161.

Upon receiving the message, the message management unit 161 determines whether the status of video output in the digital home appliance 100 satisfies the user setting information stored in the user setting information storage unit 163. If the status of the output video satisfies the user setting information, the message management unit 161 controls the message to be displayed. If not, the message management unit 161 stores the message in the message storage unit 162 so that the message can be later displayed.

Figure 2:
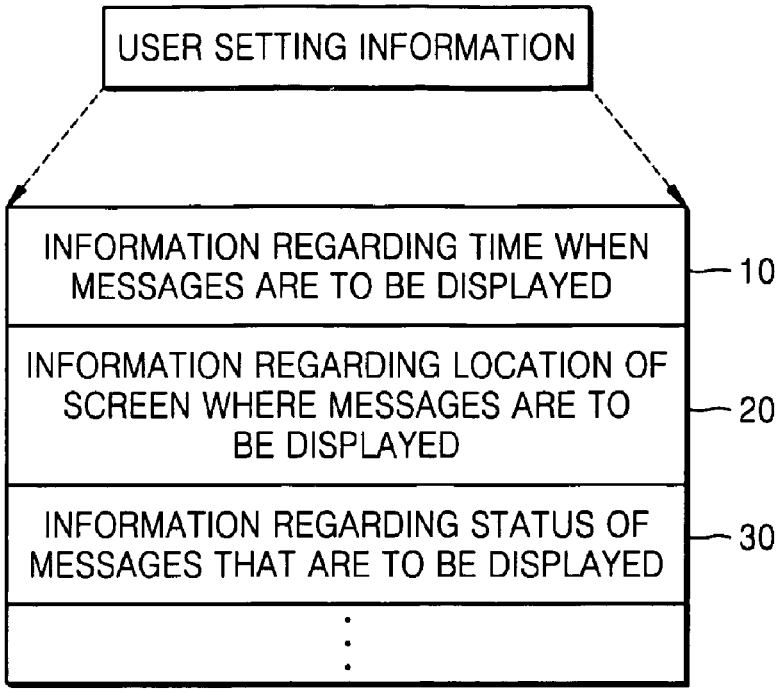
FIG. 2 is a diagram illustrating a data construction of user setting information described with reference to FIG. 1, according to an exemplary embodiment of the present invention.

FIG. 2 is a diagram illustrating a data construction of the user setting information as described with reference to FIG. 1, according to an exemplary embodiment of the present invention. Referring to FIG. 2, the user setting information includes information 10 regarding the time when messages are to be displayed, information 20 regarding a location on the screen where the messages are to be displayed, and information 30 regarding the statuses of the messages that are to be displayed.

The information 10 specifies the time when a user desires to display the messages. The information 10 may be visualized, or displayed when a broadcast program of no interest to the user is running in the digital home appliance 100. For example, the user may set such that messages are to pop up when advertisements being shown in the digital home appliance 100.

The information 20 specifies the location on the screen where the user desires to display the messages. For instance, the messages may be displayed in the center or an edge of the screen.

The information 30 may specify the font or the transparency of the messages to be displayed. For example, characters contained in a message may be displayed to be semitransparent, opaque, or decorated with colors.

The data construction of the user setting information illustrated in FIG. 2 is just an example, and may further contain other types of setting information.

Figure 3:
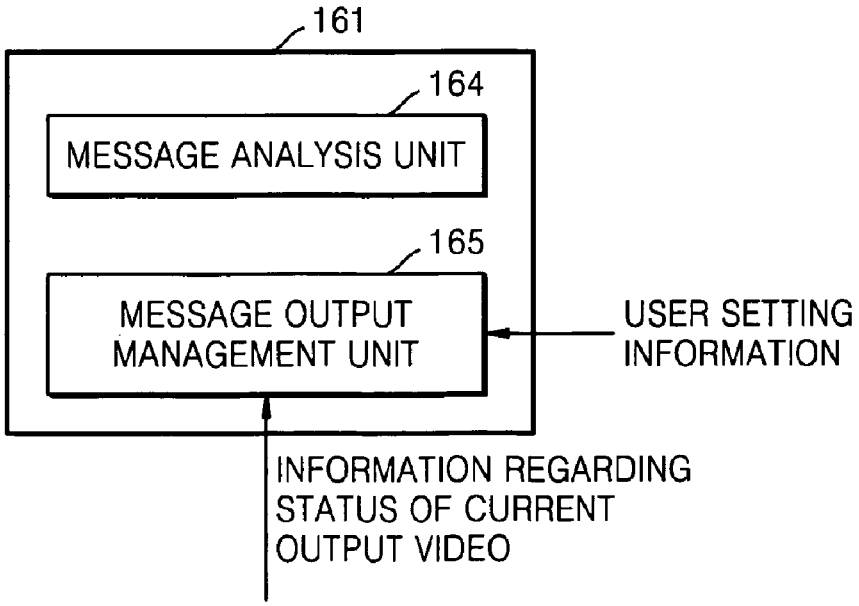
FIG. 3 is a detailed block diagram of a message management unit illustrated in FIG. 1.

FIG. 3 is a detailed block diagram of the message management unit 161 of FIG. 1. Referring to FIG. 3, the message management unit 161 includes a message analysis unit 164 and a message output management unit 165.

The message analysis unit 164 receives a message via a communication network and determines whether the received message is urgent. If it is determined that the received message is urgent, the message analysis unit 164 controls the urgent message to be directly displayed on the display irrespective of the user setting information stored in the user setting information storage unit 163. The urgent message may be a disaster broadcast message that needs to be urgently reported to a user, or a message regarding degradation of the operation of the digital home appliance 100.

If it is determined that the received message is not urgent, the message analysis unit 164 transmits a control message to the message output management unit 165, so that the received message can be displayed, as managed by the message output management unit 165.

The message output management unit 165 receives the control message from the message analysis unit 164, and determines whether the received message is to be displayed based on the user setting information. In other words, the message output management unit 165 determines whether the status of video output from the digital home appliance 100 satisfies the user setting information stored in the user setting information storage unit 163. Whether the status of the output video satisfies the user setting information is determined to display the message based on the stored user setting information, i.e., according to the user's desire if the received message is not urgent.

If the status of the output video satisfies the stored user setting information, the message output management unit 165 controls the message to be displayed. If not, the message output management unit 165 controls the message to be stored in the message storage unit 162 without displaying the message, so that the message can enter a standby mode and be displayed when the status of the output video satisfies the stored user setting information.

For example, when the information 10 included in the user setting information stored in the user setting information storage unit 163 indicates an instance of time, the message output management unit 165 determines whether current time is the instance of time. Then, the message output management unit 165 directly displays the message if the current time is the instance of time, and if not, stores the message in the message storage unit 162. To display the message at the instance of time, the message output management unit 165 may include a timer that stores time information.

Also, if the information 10 included in the user setting information indicates the time when a broadcast program of no interest to the user is executed, the message output management unit 165 may analyze the status of the video output from the digital home appliance 100. The status of the output video may be determined by the type of a broadcast program that the user is presently viewing, and an electronic program guide (EPG) may be used to determine the type of the broadcast program. The EPG describes information regarding broadcast programs, e.g., times when each broadcast program starts and ends, the type of broadcast program (i.e., whether it is news, a soap opera, or sports), etc. Thus, it is possible to determine the type of broadcast program that the user is watching in a particular time zone from the EPG. If the user sets such that messages are not to be displayed while watching a sports program, the messages are displayed only when the sports program is not broadcasting.

For instance, when advertisements are set to be displayed when a broadcast program that is of no interest to the user is broadcasting, the message output management unit 165 determines whether advertisements are being output from the digital home appliance 100. Whether a program is an advertisement or a regular broadcast program may be determined by the patterns of the video and audio of the program. Compared to a regular broadcast program, loud sounds are maintained for a predetermined amount of time and scenes change quickly in an advertisement. If a program that is running is determined to have characteristics of an advertisement, it is determined that the user is not watching a regular broadcast program, it is determined that the user is now watching advertisements, and the received message may be displayed.

Also, even if the current time is not an instance of time as specified in the user setting information stored in the user setting information storage unit 163, the message output management unit 165 may control the message, which is stored in the message storage unit 162, to be displayed in response to the user's request.

Figure 4:
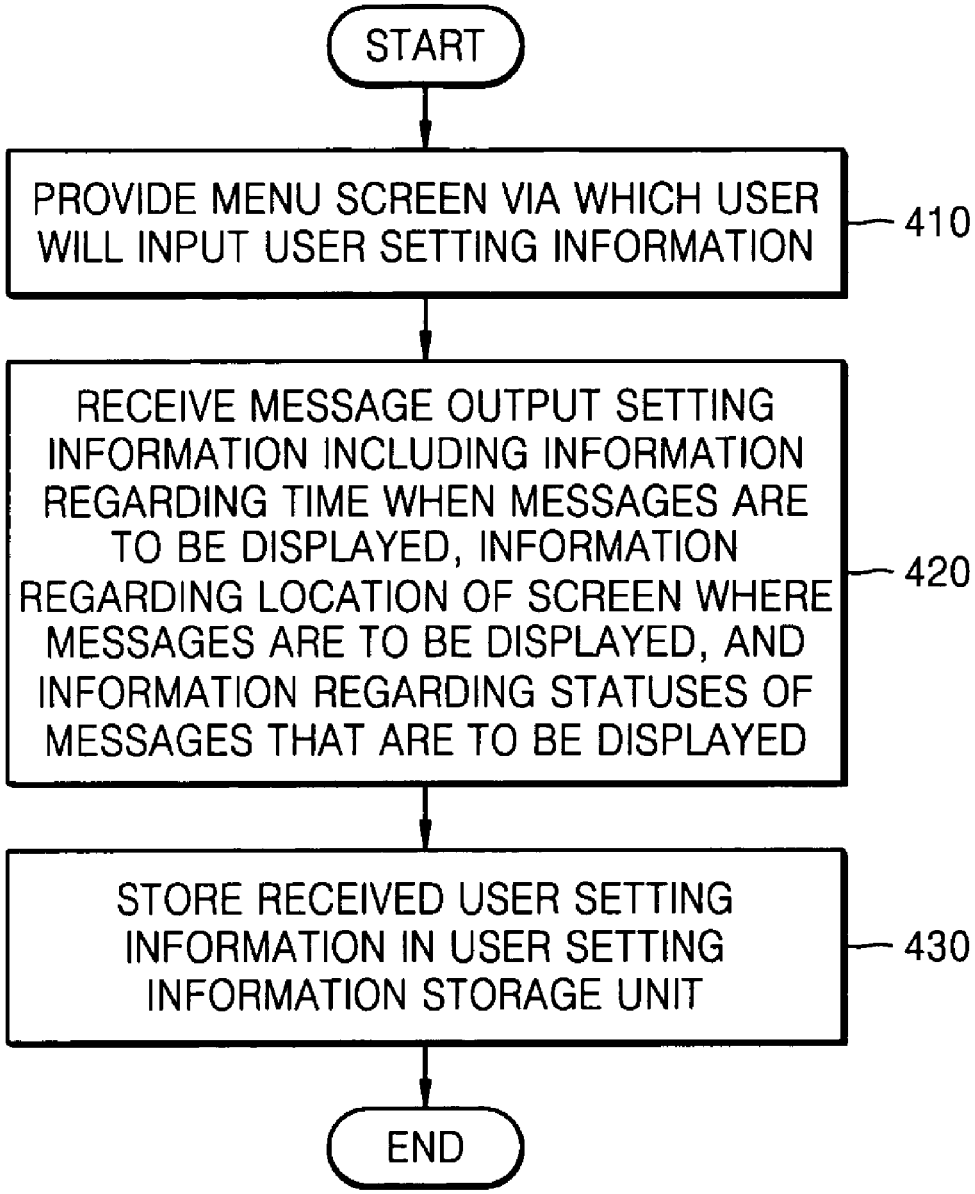
FIG. 4 is a flowchart illustrating a method of storing user setting information regarding the output of displayed messages, according to an exemplary embodiment of the present invention.

FIG. 4 is a flowchart illustrating a method of storing user setting information regarding the output of a message, which is from a user, according to an exemplary embodiment of the present invention. Referring to FIGS. 1 and 4, the controller 150 provides the user interface 140 with a menu screen via which a user will input the user setting information (410).

Next, the controller 150 receives the user setting information that includes information regarding the time when messages are to be displayed, information regarding the location on the screen where the messages are to be displayed, and information regarding the statuses of the messages that are to be displayed, via the user interface 140 (420). Next, the controller 150 stores the received user setting information in the user setting information storage unit 163 (430).

Figure 5:
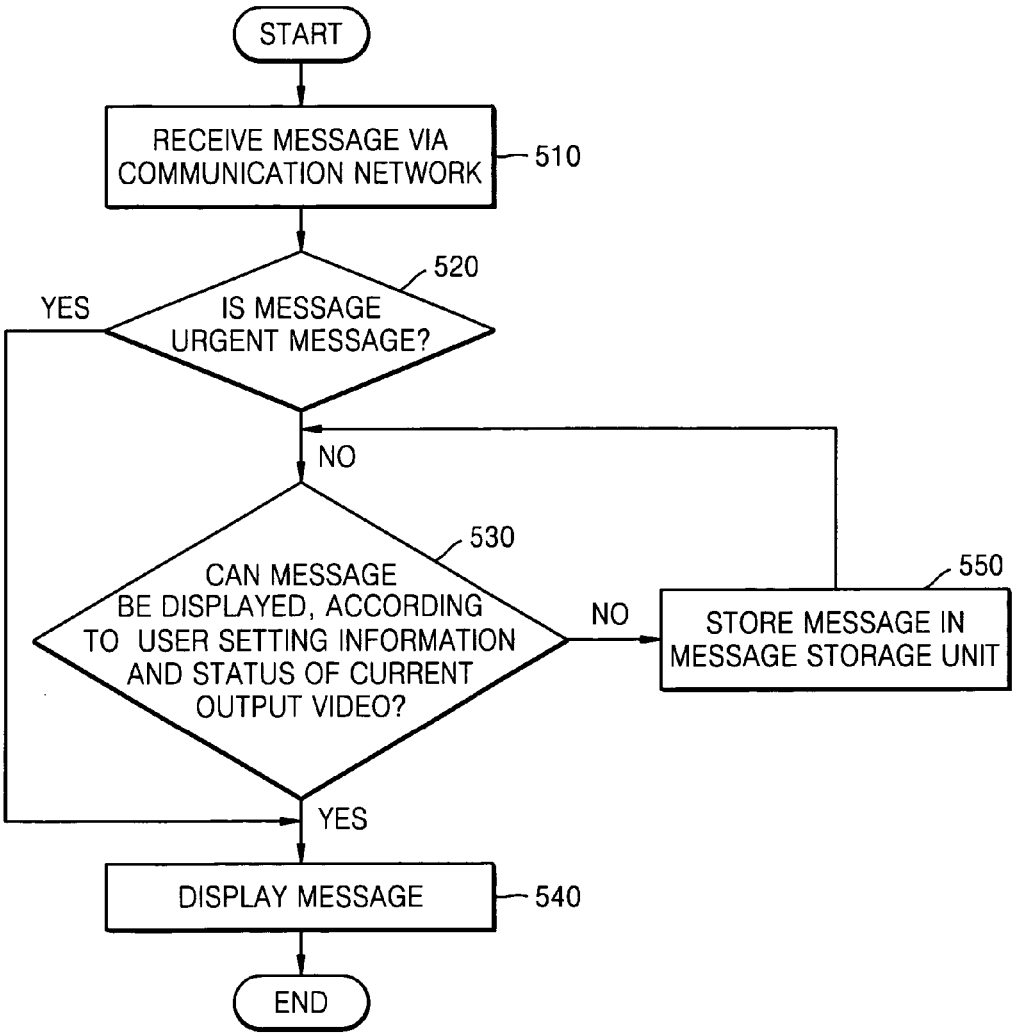
FIG. 5 is a flowchart illustrating a method of controlling the displaying of a message in a digital home appliance, according to an exemplary embodiment of the present invention.

FIG. 5 is a flowchart illustrating a method of controlling the displaying of messages in the digital home appliance 100 according to an exemplary embodiment of the present invention. Referring to FIGS. 1 and 4, when receiving a message via a communication network (510), the message management unit 161 analyzes the received message to determine whether it is an urgent message (520).

If it is determined in operation 520 that the message is urgent, the received message is directly displayed (540). If not, whether the received message can be displayed is determined by checking the user setting information and the current status of video (530).

If it is determined in operation 530 that the message can be displayed, the message is displayed (540), and if not, the message is stored in the message storage unit 162 (550). Thereafter, the method proceeds to operation 530 to monitor the status of the output video.

The present invention may be embodied as computer readable code in a computer readable medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as computer readable code in the distributed system. Function programs, code, and code segments needed to perform the present invention can be easily derived by programmers in the technical field to which the present invention pertains.

As described above, according to exemplary embodiments of the present invention, it is possible to allow a user to receive messages from a digital home appliance at an instance of time when the user desires to view them, so that the user can conveniently receive sufficient information from the digital home appliance.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of displaying a message in a digital appliance, comprising: storing user setting information regarding output of at least one message; and displaying the at least one message based on the user setting information, wherein the displaying of the *at least one* message comprises: determining whether a status of video output from the digital appliance satisfies the user setting information; and displaying the at least one message when it is determined that the status of the output video satisfies the user setting information, wherein the determining of whether the status of the video satisfies the user setting information comprises determining the status of the video based on video type according to an electronic program guide of the video,

*wherein the displaying of the at least one message further comprises:*

*storing the at least one message without displaying the at least one message when it is determined that the status of the output video does not satisfy the user setting information, monitoring the status of the output video and displaying the at least one message which is stored when the status of the video satisfies the user setting information.*

2. The method according to claim 1, wherein the user setting information is received from a user.

[3. The method of claim 1, wherein the displaying of the message further comprises monitoring the status of the output video and displaying the at least one message related to entering the standby mode when the status of the video satisfies the user setting information.]

4. The method of claim 1, wherein the *displaying of the at least one* message [related to entering the standby mode is displayed if the status of the video does not satisfy the user setting information] *further comprises displaying the at least one message in response to a user's request when it is determined that the status of the output video does not satisfy the user setting information.*

5. The method of claim 1, wherein the electronic program guide is received by the digital appliance.

6. The method of claim 1, wherein the determining of whether the status of the video satisfies the user setting information additionally comprises determining the status of the video by the patterns of the video and audio output from the digital appliance.

7. The method of claim 1, wherein, if the at least one message is urgent, further comprising displaying the at least one message without reference to the user setting information.

8. The method of claim 7, wherein the at least one message comprises at least a message indicating degradation of operation of the digital appliance.

9. The method of claim 1, wherein the user setting information comprises at least information regarding a time when the at least one message is to be displayed.

10. An apparatus for controlling displaying of a message in a digital appliance, comprising: a user setting information storage unit which stores user setting information regarding output of the message; and a *processor in association with a memory, the memory comprising instructions to:*

[message management unit which controls] *control* displaying of the message based on the stored user setting information [wherein the message management unit]:

[determines] *determine* whether a status of video output from the digital appliance satisfies the user setting information; [and]

[displays] *display* the message when it is determined that the status of the output video satisfies the user setting information, *and*

*store the message in a message storage unit without displaying the message when it is determined that the status of the output video does not satisfy the user setting information, monitor the status of the output video and display the message which is stored when the status of the video satisfies the user setting information,* wherein the [message management unit] *processor* determines whether the status of the output video satisfies the user setting information by checking the status of the output video based on video type according to an electronic program guide of the video.

11. The apparatus of claim 10, wherein the user setting information is received from a user.

[12. The apparatus of claim 10, wherein the message management unit further monitors the status of the output video and controls the stored message to be displayed when the status of the output video satisfies the user setting information.]

13. The apparatus of claim 10, wherein the electronic program guide is received by the digital appliance.

14. The apparatus of claim 10, wherein the [message management unit] *processor* determines whether the status of the output video satisfies the user setting information by additionally checking the status of the output video by the patterns of the video and audio output from the digital appliance.

15. The apparatus of claim 10, wherein, when the message is urgent, the [message management unit] *processor* further controls the message to be displayed without reference to the user setting information.

16. The apparatus of claim 15, wherein the message comprises at least a message indicating degradation of operation of the digital appliance.

17. The apparatus of claim 10, wherein the user setting information comprises at least one of:

information regarding a time when the message is to be displayed;

information regarding a location on a screen where the message is to be displayed; and information regarding the status of the message that is to be displayed.

18. A digital appliance comprising: a decoder which decodes at least one of audio data and video data; *and a processor in association with a memory, the memory comprising instructions to:* [a message management unit which stores] *store* user setting information regarding output of at least one message and [controls] *control* displaying *of* the at least one message based on the stored user setting information; [and a controller which controls] *control* operations of the decoder [and the message management unit, wherein the message management unit: determines]*;* whether a status of video output from the digital appliance satisfies the user setting information; [and displays] *display* the at least one message when it is determined that the status of the output video satisfies the user setting information*; and*

*store the at least one message in a message storage unit without displaying the at least one message when it is determined that the status of the output video does not satisfy the user setting information, monitors the status of the output video and display the at least one message which is stored when the status of the video satisfies the user setting information,* wherein the [message management unit] *processor* determines whether the status of the output video satisfies the user setting information by additionally checking the status of the output video based on video type according to an electronic program guide of the video.

19. The digital appliance of claim 18, wherein the one of audio data and video data is received via a communication network.

20. The digital appliance of claim 18, wherein the user setting information is received from a user.

21. The method of claim 1, wherein the method further comprising: making the at least one message [related to entering] *enter* a standby mode when it is determined that the status of the output video does not satisfy the user setting information.

[22. The apparatus of claim 10, wherein the message management unit further stores the message in a message storage unit when the status of the output video does not satisfy the user setting information.]

*23. A method of displaying at least one message in a digital appliance, the method comprising:*

*storing user setting information related to displaying the at least one message;*

*receiving a message from a network;*

*determining that the received message is to be displayed based on the user setting information; and*

*displaying the received message while outputting a particular type of video,*

*wherein the user setting information indicates the particular type of video as a criterion for displaying the received message, so that the received message is displayed when the particular type of video is output, wherein the determining that the received message is to be displayed based on the user setting information comprises determining a type of the output video according to an electronic program guide of the output video, and*

*wherein the displaying the received message further comprises:*

*storing the received message without displaying the received message when it is determined that a type of the output video is not the particular type, monitoring the type of the output video and displaying the received message which is stored when the type of the video is the particular type.*

* * * * *